United States Patent [19]
Klusmeyer et al.

[11] Patent Number: 5,601,158
[45] Date of Patent: Feb. 11, 1997

[54] WHEEL BLOCKING SYSTEM

[75] Inventors: Louis F. Klusmeyer; Oscar E. Warren; Ronnie Rogers; Bob J. Beard, all of San Antonio, Tex.

[73] Assignee: TransTech Resources, Inc., San Antonio, Tex.

[21] Appl. No.: 514,271

[22] Filed: Nov. 13, 1995

[51] Int. Cl.⁶ .................................................. B60T 1/04
[52] U.S. Cl. ................................................ 188/31; 188/4 R
[58] Field of Search .................................. 188/2 R, 4 R, 188/31, 35, 36, 68, 69, 106 F, 265; 410/30

[56] References Cited

U.S. PATENT DOCUMENTS

| | | | |
|---|---|---|---|
| 179,314 | 5/1922 | Willis | 188/4 R |
| 1,136,851 | 4/1915 | Underhill. | |
| 2,839,163 | 6/1958 | Kelly, Jr. et al. | 188/4 R |
| 3,086,619 | 4/1963 | Grotz | 188/4 R |
| 3,117,653 | 12/1961 | Altherr | 188/29 |
| 3,722,631 | 3/1973 | Lowne | 188/4 R |
| 4,300,781 | 11/1981 | Riggs | 280/11.2 |
| 4,354,580 | 10/1982 | Delasantos et al. | 188/4 R |
| 5,042,622 | 8/1991 | Smith et al. | 188/1.12 |
| 5,435,418 | 7/1995 | Warren et al. | 188/4 R |

*Primary Examiner*—Robert J. Oberleitner
*Assistant Examiner*—Chris Schwartz
*Attorney, Agent, or Firm*—William Lloyd Clayborn; John M. Cone

[57] ABSTRACT

A wheel blocking device includes a pressure foot which is attached to one end of a pressure foot arm. The other end of the pressure foot arm is pivotally connected to either the frame or an axle of the vehicle. One end of an actuator is connected to the pressure foot arm and the other end is connected to either the frame or an axle of the vehicle. When the actuator actuates, the pressure foot is forced into engagement with a tire of the vehicle. The pressure foot indents the tire to a predetermined degree, thereby providing a positive mechanical lock to prevent rotation of the tire. A control system allows the vehicle's driver to actuate the wheel blocking device while seated in the vehicle's cab.

9 Claims, 5 Drawing Sheets

WHEEL BLOCKING SYSTEM

FIELD OF THE INVENTION

The invention relates to a system which provides a positive mechanical block for the wheels of a wheeled vehicle.

BACKGROUND OF THE INVENTION

The parking brakes of wheeled vehicles are quite prone to failure. In the case of heavy vehicles, such as those used in the mining industry, parking brake failure can result in disastrous consequences. Recognizing that fact, the U.S. Government requires the wheels of vehicles parked on a grade to be turned into a bank or berm or to be blocked. Prior to the present invention, the driver of a vehicle had to set the vehicle's parking brake, then get out of the vehicle's cab to place blocks by the vehicle's tires. This is a cumbersome procedure. In addition, it is possible for the vehicle's parking brake to fail while the driver is placing the blocks, thereby causing an accident.

SUMMARY OF THE INVENTION

A wheel blocking device includes a pressure foot which is attached to one end of a pressure foot arm. The other end of the pressure foot arm is pivotally connected to either the frame or an axle of the vehicle. One end of an actuator is connected to the frame or an axle of the vehicle. When the actuator actuates, the pressure foot is forced into engagement with a tire of the vehicle. The pressure foot indents the tire to a predetermined degree, thereby providing a positive mechanical lock to prevent rotation of the tire. A control system allows the vehicle's driver to actuate the wheel blocking device while seated in the vehicle's cab.

BRIEF DESCRIPTION OF THE DRAWINGS

Several embodiments of the invention will be described, by way of example only, with reference to the accompanying drawings, in which.

DETAILED DESCRIPTION OF THE INVENTION

Figure 1:
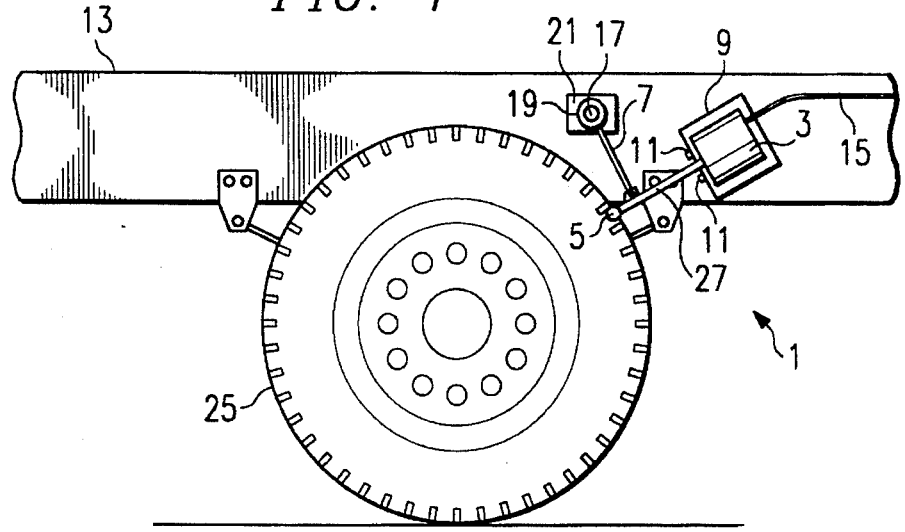
FIGS. 1 and 2 are side and top views of portion of a wheeled vehicle having wheel blocking device in accordance with the invention.
Figure 2:
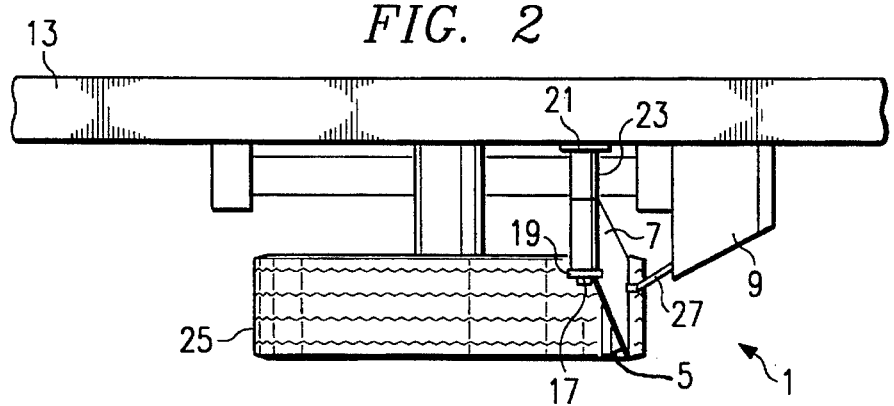

FIGS. 1–4 show an embodiment of the invention which is installed on the rear portion of a heavy vehicle, such as a truck, tractor, or semitrailer. A wheel blocking device 1 comprises a pneumatic cylinder 3, a pressure foot 5, and a pressure foot arm 7. In this embodiment, the pneumatic cylinder 3 is a conventional air brake chamber. The cylinder 3 is mounted to a cylinder mount 9 by means of two bolts 11. The cylinder mount 9 is attached to the frame 13 of the vehicle by conventional means such as bolts or welding. A conduit 15 provides high pressure air to actuate the cylinder 3.

The pressure foot 5 is attached to one end of the pressure foot arm 7 and extends substantially perpendicularly thereto. The opposing end of the pressure foot arm 7 is pivotally mounted on a pivot tube 17. A retaining collar 19 at the outer end of the pivot tube 17 retains the pressure foot arm 7 thereon. The inner end of the pivot tube 17 is welded to a pivot tube base 21, and the pivot tube base 21 is attached to the vehicle frame 13 by bolts or welding. A spacer 23 spaces the pressure foot arm 7 outwardly from the frame 13 to align the pressure foot 5 with the vehicle tire 25. A shaft 27 extends from the cylinder 3 to the pressure foot arm 7. One end of the shaft 27 is pivotally connected to the cylinder 3 and the other is pivotally connected to an ear 29 on the pressure foot arm 7. When a controlled amount of high pressure air is supplied to the cylinder 3 through the conduit 15, the cylinder 3 extends, thereby pushing the shaft 27, and hence the pressure foot 5, toward the tire 25.

Figure 5:
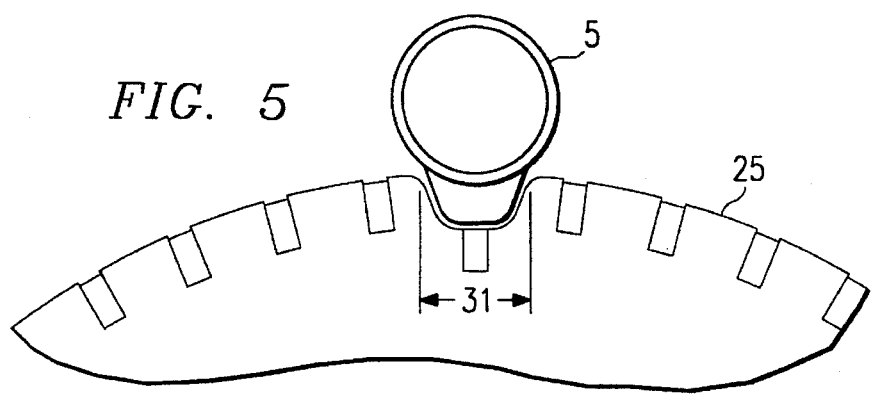
FIG. 5 is a side view of a portion of a vehicle tire and the pressure foot of the device of FIGS. 1–4.
Figure 3:
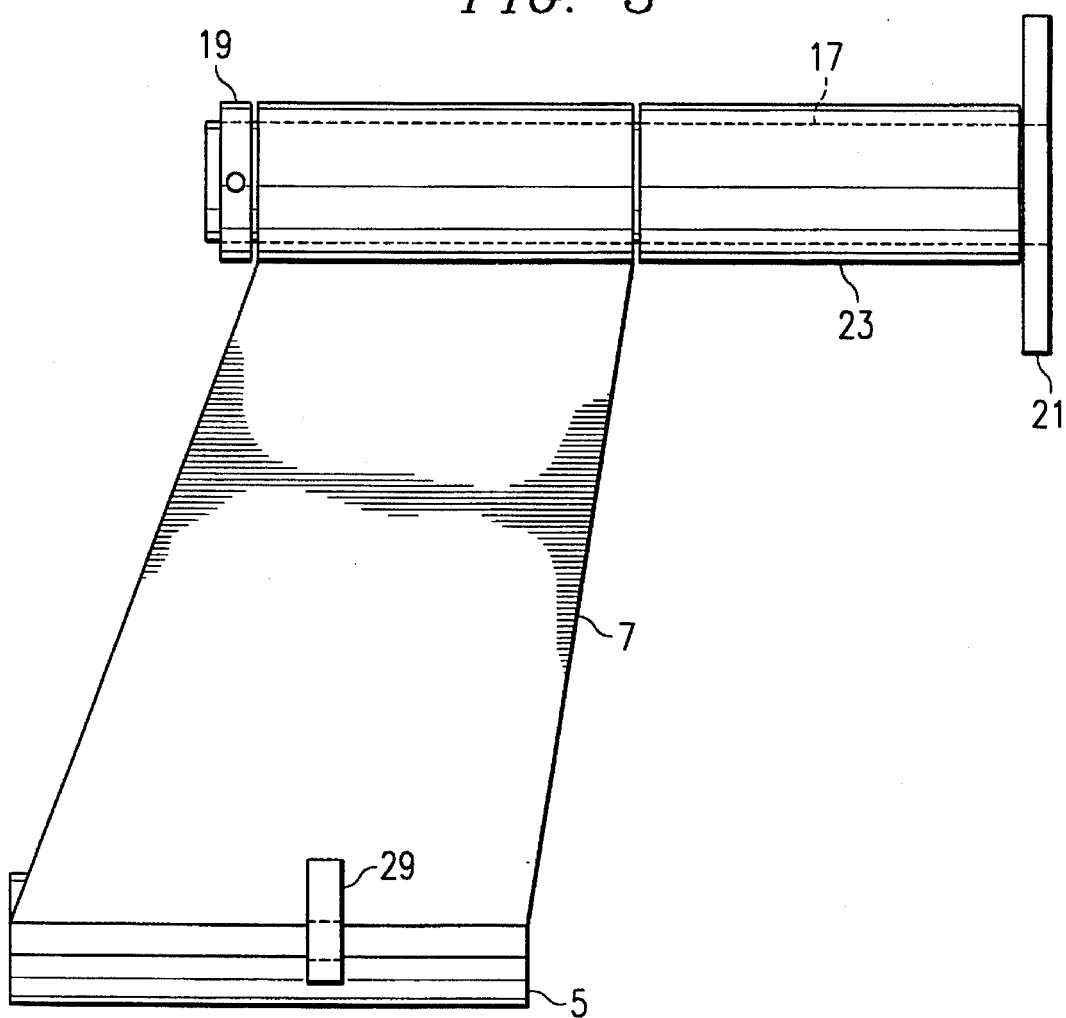
FIGS. 3 and 4 are top and side views of the pressure foot arm and pressure foot of the device of FIGS. 1 and 2.
Figure 4:
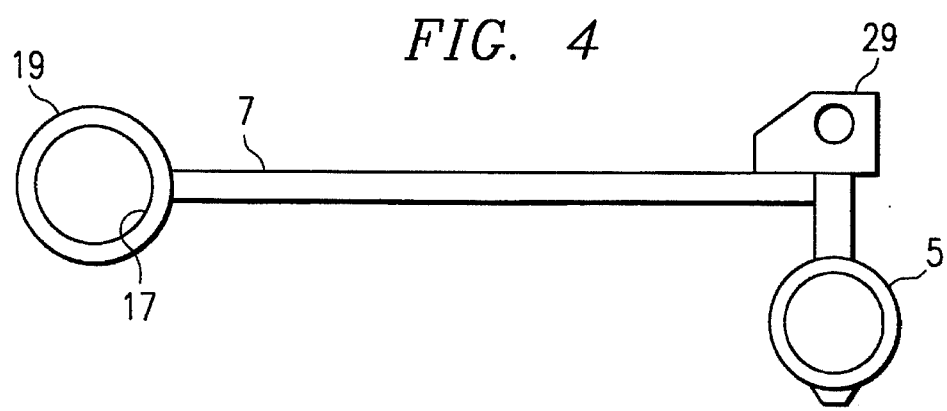

An important feature of the invention is shown in FIG. 5. When the wheel blocking device 1 is actuated, the pressure foot 5 indents a contact area 31 of the tire 25 to a predetermined depth. As a result, the wheel blocking device 1 provides a positive mechanical lock between the frame 13 of the vehicle and the tire 25. The required depth of the indentation by the pressure foot 5 is determined individually for each vehicle on which the blocking device is installed.

When air pressure is removed from the pneumatic cylinder 3, a spring (not shown) within the cylinder 3 pulls the pressure foot arm 7 away from the tire 25, thereby disengaging the pressure foot 5 from the tire 25.

Figure 6:
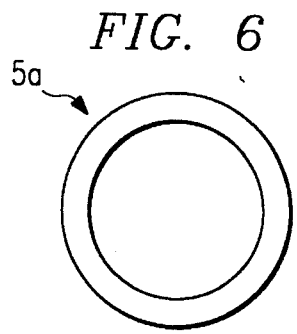
FIGS. 6–8 show three different pressure foot configurations.
Figure 7:
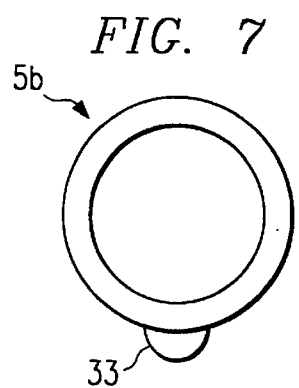
Figure 8:
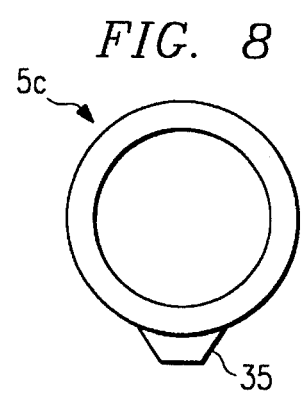

FIGS. 6–8 show three configurations for the pressure foot 5. The pressure foot 5a in FIG. 6 is constructed of a length of 1½ inch black pipe having an outside diameter of approximately 1.9 inches. The pressure foot 5b shown in FIG. 7 includes an approximately ⅛ inch projection 33 formed by a weld bead on the full length of the surface of the pressure foot 5b. The pressure foot 5c shown in FIG. 8 includes a generally trapezoidal projection which is approximately ⅜ inch high and one inch at the base 35 and which extends the full length of the pressure foot 5c.

Figure 9:
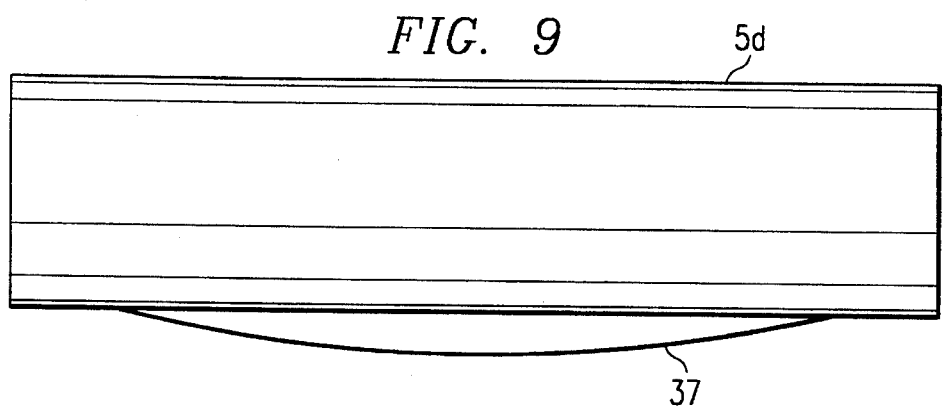
FIGS. 9 and 10 are side and end views of another pressure foot configuration.
Figure 10:
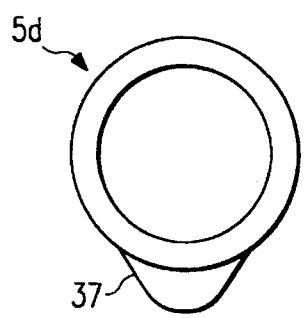

The pressure foot 5d shown in FIGS. 9 and 10 has given the superior performance. As with the pressure feet 5a–5c shown in FIGS. 6–8, the pressure foot 5d is made of 1½ inch black pipe. As can be seen, a projection 37 has been added to the surface of the pipe. The projection 37 extends radially a maximum of approximately ½ inch at the transverse mid-point of the pipe. The projection 37 tapers inwardly toward the pipe as it extends from the mid-point of the pipe to the opposing edges.

Figure 11:
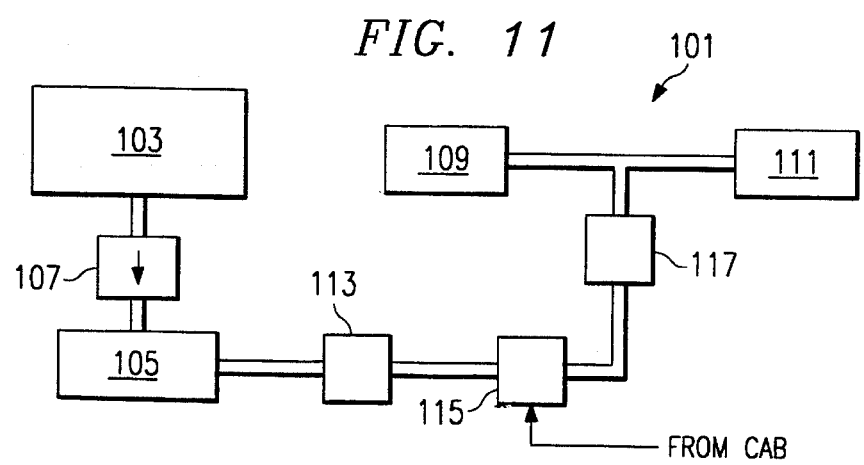
FIG. 11 is a block diagram of a control system for the wheel blocking device shown in FIGS. 1–4.

FIG. 11 shows a control system 101 for the wheel blocking device 1. Pressurized air is provided from the vehicle's service air system 103 to a separate wheel blocking device air reserve tank 105 through a check valve 107. Air is supplied from the tank 105 to the two brake chambers 109, 111 (there being a wheel blocking device 1 on each side of the vehicle) through a pressure regulator 113, a solenoid control valve 115, and a quick release valve 117. The electrically-controlled control valve 115 opens to actuate the cylinders 109, 111 when a switch (not shown) in the vehicle's cab (not shown) is closed by the vehicle's driver (not shown). When the driver (not shown) opens the switch (not shown), the control valve 115 closes, terminating the supply of pressurized air to the pneumatic cylinders 109, 111; and the quick-release valve 117 opens, releasing the pressurized air in the cylinders 109, 111.

Figure 12:
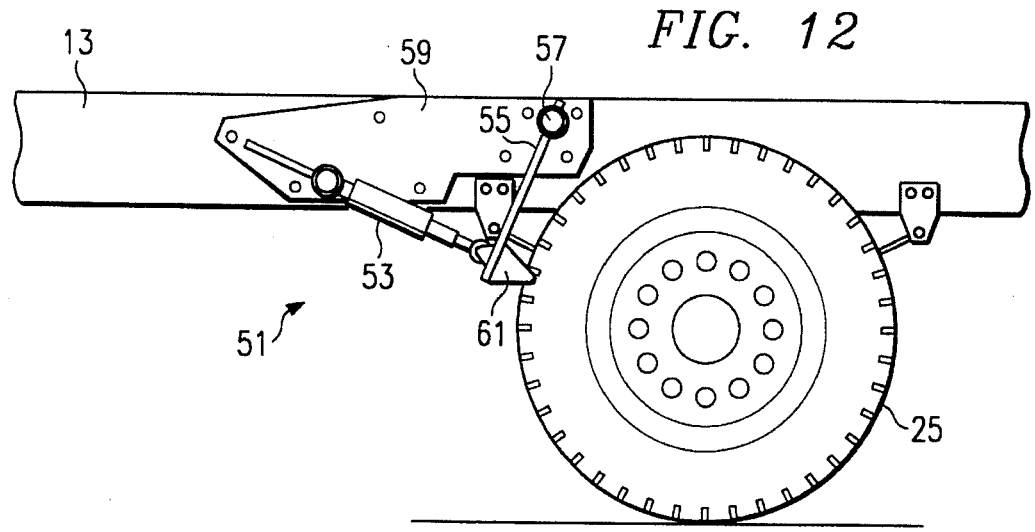
FIG. 12 is a side view of another embodiment of the invention, one in which the wheel blocking device is mounted on a plate and the plate is bolted to the vehicle.

FIG. 12 shows another embodiment of the invention. The wheel blocking device 51 is similar that shown in FIGS. 1–4. In this embodiment, however, a hydraulic cylinder 53 is used to actuate the pressure foot arm 55. In addition, the cylinder 53 and pivot tube 57 are attached to a plate 59, and the plate 59 is bolted to the vehicle frame 13. Finally, the pressure foot 61 in this embodiment is generally triangular.

Figure 13:
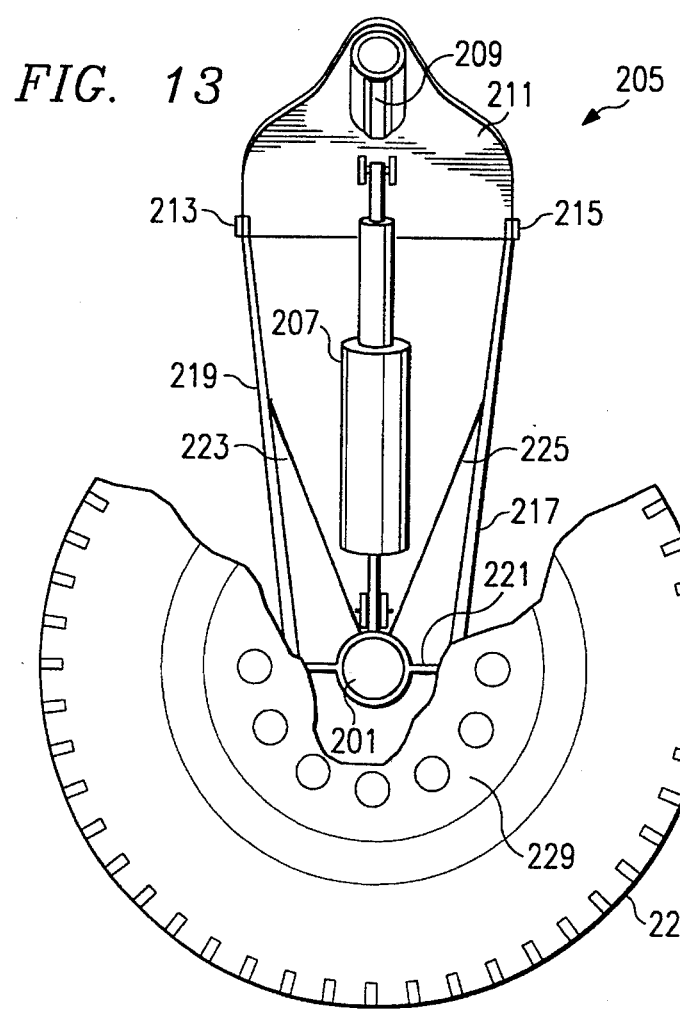
FIGS. 13 and 14 are side and top views of another embodiment of the invention, one of which is mounted on the vehicle's axle.
Figure 14:
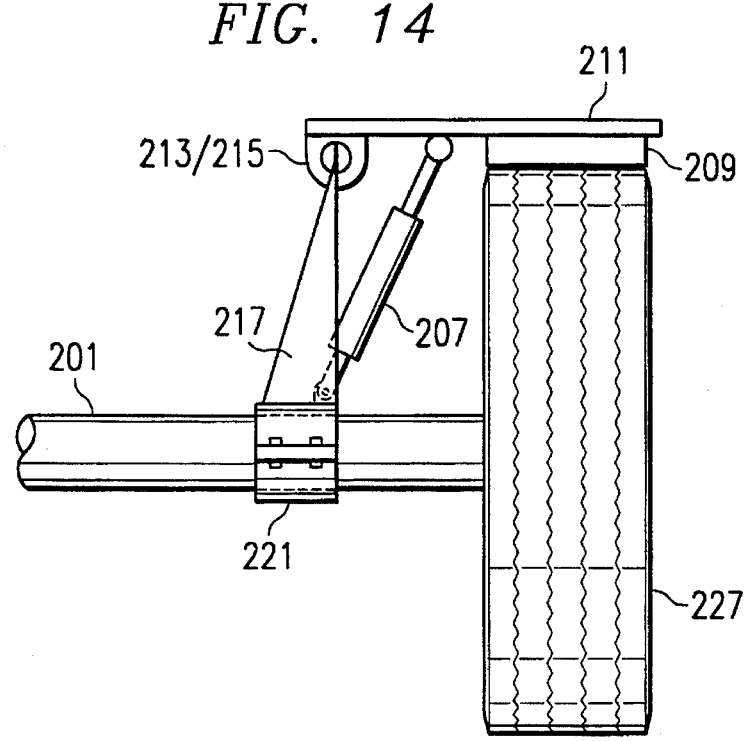

FIGS. 13–14 show yet another embodiment of the invention which is installed on an axle 201 of a heavy vehicle 203, such as a tractor. A wheel blocking device 205 comprises a two-way hydraulic cylinder 207, a pressure foot 209, and a pressure foot arm 211. Two pair of lugs 213, 215 at the inner end of the pressure foot arm are pivotally attached to two support arms 217, 219. The support arms 217, 219 are removably attached to the axle 201 by an axle mount 221. Gussets 223, 225 reinforce the support arms 217, 219 to resist bending in the direction of wheel movement.

The hydraulic cylinder 207 is pivotally attached to the axle mount 221. The top end of the cylinder 207 is pivotally attached to the bottom of the pressure foot arm 211. When actuated, hydraulic cylinder 207 pulls the pressure foot arm 211, which brings the pressure foot 209 into engagement with the tire 227 as shown in FIG. 14.

As with the embodiments described in connection with FIGS. 1–12, when the wheel blocking device 205 is actuated, the pressure foot 209 indents the tire 227 to a predetermined depth. As a result, the wheel blocking device 205 provides a positive mechanical lock between the axle 201 of the vehicle, the wheel 229, and the tire 227.

Figure 15:
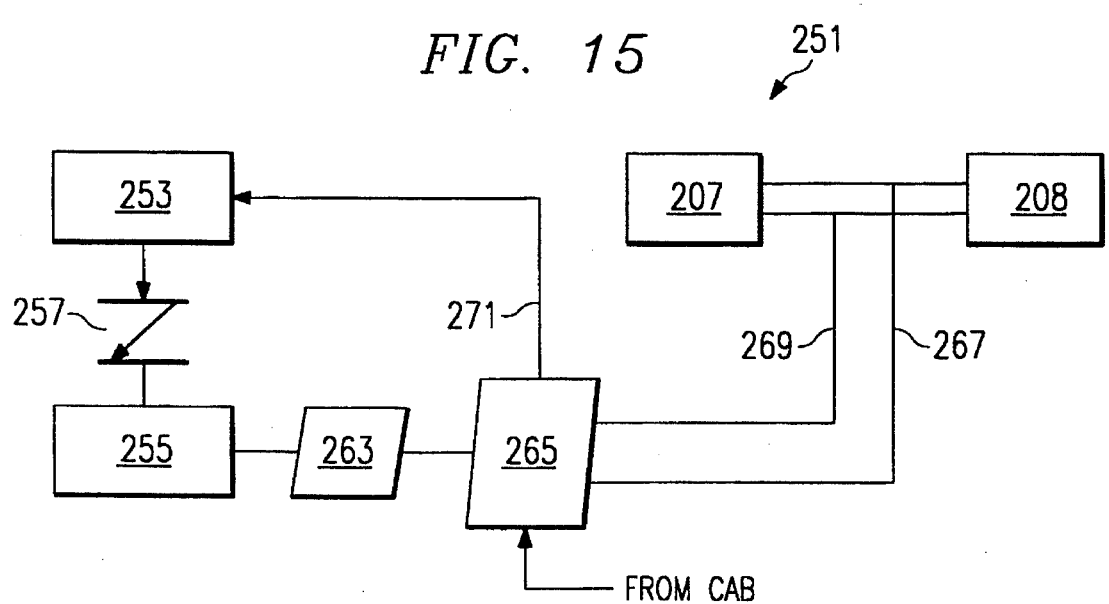
FIG. 15 is a block diagram of a control system for the wheel blocking device of FIGS. 13 and 14.

FIG. 15 shows a control system 251 for the wheel blocking device 205. Pressurized hydraulic fluid is provided from the vehicle's service hydraulic system 253 to a wheel blocking device hydraulic accumulator 255 through a check valve 257. Hydraulic fluid from the accumulator 255 is supplied to two or more hydraulic cylinders 207, 208 (there being at least a wheel blocking device 205 for at least one tire on each side of the vehicle) through a pressure regulator 263 and a solenoid control valve 265. When a switch (not shown) in the vehicle's cab (not shown) is closed by the vehicle's driver (not shown), the control valve 265 ports pressurized fluid through conduit 267 to the to chamber in each of the cylinders 207, 208. Simultaneously, the control valve 265 ports the fluid in the bottom chamber of each of the cylinders 207, 208 to the reservoir of the service hydraulic system 253 through conduits 269, 271. As a result the cylinders 207, 208 pull their respective pressure foot arms 211 down to engage their respective pressure feet 209 into engagement with their respective tires 227. When the switch (not shown) is open, pressurized fluid is ported to the bottom chamber of each cylinder 207, 208, and the fluid in the top chamber of each cylinder 207, 207 is ported to the service hydraulic system reservoir, thereby raising the pressure foot arm 211.

While several embodiments of the invention have been shown and described, it will be apparent to those skilled in this art that various modifications may be made to these embodiments without departing from the spirit of the present invention. For that reason, the scope of the invention is set forth in the following claims.

We claim:

1. A wheel blocking device for a wheeled vehicle comprising:

a pressure foot attached to a pressure foot arm, the pressure foot arm adapted to be pivotally connected to one of a frame of the vehicle and an axle of the vehicle;

an actuator including a first end connected to one of the pressure foot and the pressure foot arm and a second end adapted to be connected to one of the vehicle frame and the vehicle axle;

a power source for actuating the actuator; and means for controlling the application of the power source to the actuator;

whereby, when the power source is applied to the actuator, the pressure foot is forced into engagement with a vehicle tire, the pressure foot substantially indenting the tire to a predetermined degree without contacting the ground.

2. the device of claim 1, wherein the pressure foot comprises a generally cylindrical member.

3. The device of claim 2, wherein the pressure foot further comprises a contact member extending substantially radially from the generally cylindrical member.

4. The device of claim 1, wherein the control means comprises an electrically-actuated valve.

5. The device of claim 4, wherein the electrically-actuated valve is controlled by an electrical switch located adjacent to a driver's position in a cab of the vehicle.

6. A wheel blocking device for a wheeled vehicle comprising:

a pressure foot arm having a first end to which a pressure foot is attached and a second end which is adapted to be pivotally connected to one of a frame of the vehicle and a vehicle axle;

an actuator having a first end adapted to be connected to one of the vehicle frame and the vehicle axle and a second end connected to one of the pressure foot arm and the pressure foot; and a power source for actuating the actuator; whereby when the power source is applied to the actuator, the pressure foot is forced into engagement with a vehicle tire, such that the pressure foot substantially indents the tire to a pedetermined degree without contacting the ground.

7. The device of claim 6, wherein the pressure foot arm is pivotally attached to a first end of a support member and a second end of the support member is adapted to be attached to the vehicle axle.

8. The device of claim 6 further comprising means for controlling application of the power source to the actuator.

9. The device of claim 8, wherein the control means comprises a valve which is controlled from a position adjacent to a driver's position in a cab of the vehicle.

* * * * *